Patented Feb. 2, 1943

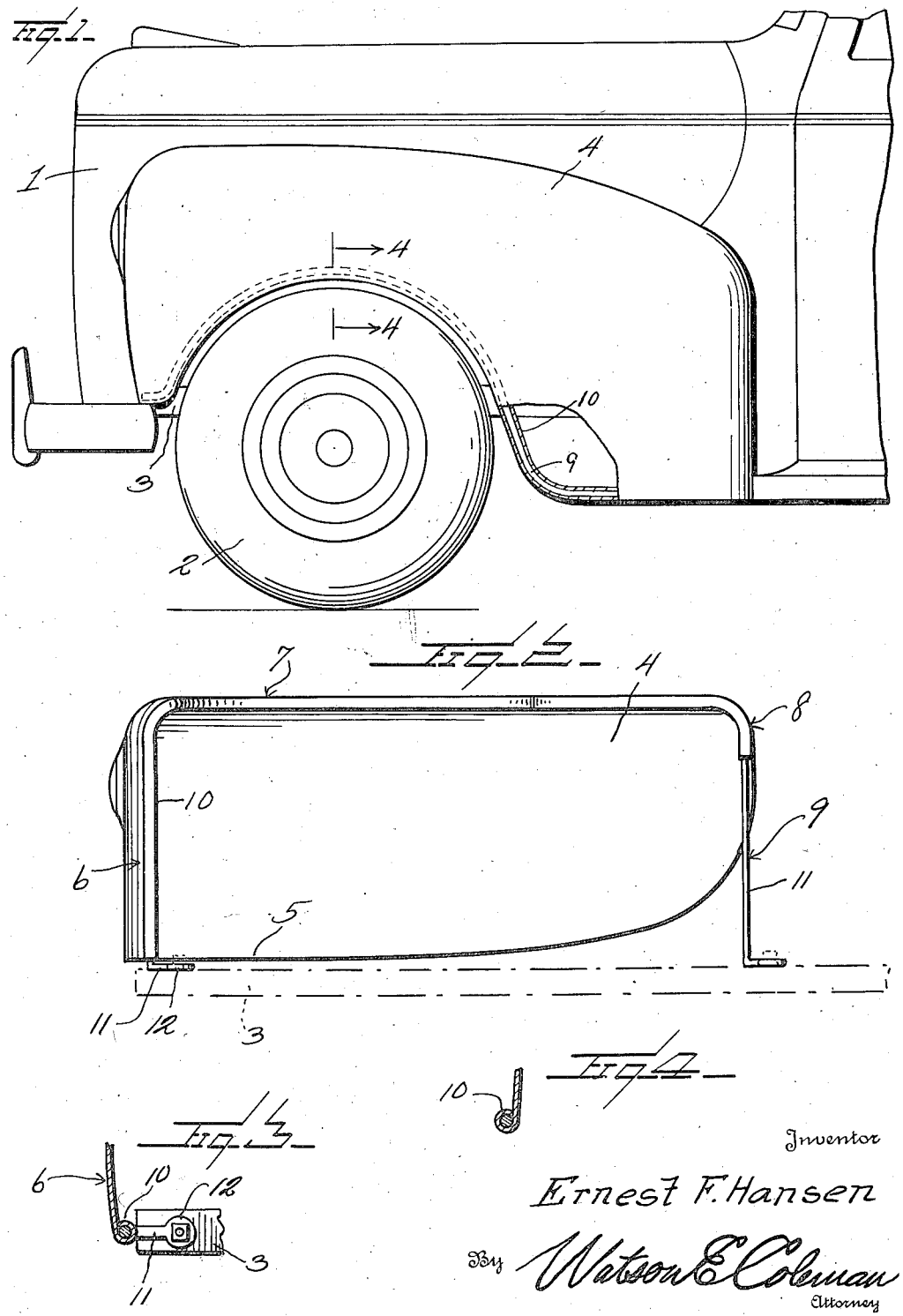

2,309,898

UNITED STATES PATENT OFFICE 2,309,898

REINFORCED VEHICLE FENDER

Ernest F. Hansen, Meridian, Tex.

Application January 28, 1941, Serial No. 376,378

1 Claim. (Cl. 280—152)

This invention relates generally to the class of vehicle bodies and pertains particularly to improvements in fender construction for motor vehicles.

In motor vehicle construction, the guards or fenders which form a part of the vehicle body are shaped from single sheets of metal by the process of pressing and drawing, and certain edges of the fenders are free of support when the fender is secured to the vehicle body or the vehicle chassis frame and, therefore, in the event of collision, the result is likely to be a breaking or tearing of the metal of the fender from the free or unsupported edge.

The primary object of the present invention is to provide a vehicle fender construction in which the free or outside edge together with the forward and rear edges thereof are reinforced by an outlining bracing bar which is rigidly coupled at its ends to the adjacent frame of the vehicle and which functions to give a rigidity to the edge of the fender which prevents splitting or tearing of the same.

Another object of the invention is to provide a vehicle fender construction having a reinforced free edge portion wherein the reinforcing means is entirely hidden from view as a result of which the appearance of the fender is not affected.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in side elevation of the forward portion of a motor vehicle showing one form of fender construction embodying the present invention.

Fig. 2 is a view in bottom plan of the fender shown in Fig. 1 and illustrating the outlining bracing bar for the free edge thereof.

Fig. 3 is a fragmentary sectional view illustrating the connection of one end of the bracing bar with the chassis frame.

Fig. 4 is a sectional view on the line 4—4 of Fig. 1.

Referring now more particularly to the drawing, the numeral 1 generally designates the hood portion of a motor vehicle body, one front wheel of which is indicated at 2, while a portion of the chassis frame for the vehicle is indicated by the numeral 3.

The numeral 4 designates a fender in the construction of which the present invention is exemplified. Such fenders, as is well known, are ordinarily secured by welding or in any other suitable manner at the inner edge, such edge being here indicated by the numeral 5, to an adjacent part of the vehicle body, but the forward, rear and outer side edges indicated, respectively, by the numerals 6, 7 and 8 are free of support or reinforcement and, therefore, are liable to be torn or broken in the event that the fender is in collision with some other object. In accordance with the present invention, there is provided a reinforcing bar or bracket which is suitably shaped to follow the contour of the joined edges 6, 7 and 8, this bar being indicated as a whole by the numeral 9. The bar is arranged so that the portions thereof corresponding to the edges of the fender will lie adjacent the inner faces of these fender edges and the material of the fender is then turned or rolled under and inwardly, as indicated at 10 in Figs. 3 and 4, to enclose the adjacent portions of the reinforcing or bracing bar. The bar 9 has two terminal or leg portions 11, and each of these portions is turned to provide an attaching foot 12 or such a foot may be attached to each leg, as may be found most convenient for the manufacturer. These attaching feet are then firmly secured by bolts, rivets or in any other suitable manner to the adjacent side of the chassis frame 3, so that the bracket extends outwardly from the side of the chassis frame and forms a more or less rigid support for the outer edge of the fender and additionally functions as a means for preventing the edge of the fender splitting or tearing in the event that the fender is in collision with another car or other object.

From the foregoing, it will be readily seen that a fender constructed in accordance with the present invention will be less likely to tear or become broken than the ordinary types of fenders where the only reinforcement for the free edges thereof consists in a seam which constitutes a turned back part of the fender metal.

What is claimed is:

A tear-resisting motor vehicle fender, comprising a fender body having forward and rear substantially horizontal edge portions and a side edge portion, a reinforcing bar frame having an outer side shaped to conform to the side edge portion of the fender body, said outer side of the frame merging into two straight leg portions, said leg portions and said outer side of the frame being disposed at the inner side of the corresponding edges of the fender body, the said edges of the fender body being turned inwardly over and secured to the adjacent portions of the frame, said leg portions of the frame being horizontally disposed and being in the plane of the adjacent portion of the chassis frame of the vehicle on which the fender is mounted, each of said leg portions terminating at its free end in a right angularly extending short attaching portion adapted to position against the outer side of the said chassis frame and each of said attaching portions terminating in a flat eye through which an attaching bolt, screw or the like may be passed into the adjacent chassis frame for rigidly securing the said reinforcing bar frame to the chassis frame.

ERNEST F. HANSEN.